US008751903B2

(12) United States Patent
Byom et al.

(10) Patent No.: US 8,751,903 B2
(45) Date of Patent: Jun. 10, 2014

(54) METHODS AND SYSTEMS FOR MONITORING WRITE OPERATIONS OF NON-VOLATILE MEMORY

(75) Inventors: Matthew Byom, Campbell, CA (US); Nir J. Wakrat, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 287 days.

(21) Appl. No.: 12/843,463

(22) Filed: Jul. 26, 2010

(65) Prior Publication Data
US 2012/0023365 A1    Jan. 26, 2012

(51) Int. Cl.
*G11C 29/00* (2006.01)

(52) U.S. Cl.
USPC ............................ 714/773; 714/42; 714/763

(58) Field of Classification Search
USPC ..................... 714/42, 718, 763, 773; 365/200
See application file for complete search history.

(56) References Cited

U.S. PATENT DOCUMENTS

| | | | |
|---|---|---|---|
| 4,570,217 A | 2/1986 | Allen et al. | |
| 6,631,086 B1 | 10/2003 | Bill et al. | |
| 6,813,678 B1 | 11/2004 | Sinclair et al. | |
| 6,823,507 B1 | 11/2004 | Srinivasan et al. | |
| 6,834,364 B2 | 12/2004 | Krech, Jr. et al. | |
| 7,334,159 B1 | 2/2008 | Callaghan | |
| 7,447,869 B2 | 11/2008 | Kruger et al. | |
| 7,945,826 B2 * | 5/2011 | Kameda et al. | 714/723 |
| 8,041,882 B2 * | 10/2011 | Jachalsky et al. | 711/103 |
| 8,060,797 B2 * | 11/2011 | Hida et al. | 714/704 |
| 8,179,367 B2 * | 5/2012 | Kitaura | 345/156 |
| 2002/0124129 A1 * | 9/2002 | Zilberman | 711/103 |
| 2006/0053357 A1 | 3/2006 | Rajski et al. | |
| 2006/0168475 A1 | 7/2006 | Segers et al. | |
| 2006/0200726 A1 | 9/2006 | Gittins et al. | |
| 2008/0052446 A1 * | 2/2008 | Lasser et al. | 711/103 |
| 2008/0209294 A1 | 8/2008 | Brink et al. | |
| 2010/0122148 A1 * | 5/2010 | Flynn et al. | 714/773 |
| 2010/0332949 A1 | 12/2010 | d'Abreu et al. | |
| 2011/0010698 A1 | 1/2011 | Byom et al. | |
| 2011/0239064 A1 | 9/2011 | Byom et al. | |
| 2011/0252289 A1 * | 10/2011 | Patapoutian et al. | 714/763 |

FOREIGN PATENT DOCUMENTS

EP        0794484        9/1997

OTHER PUBLICATIONS

Jim Cooke, "Micron® e-MMC™ Embedded Memory Simplifies High-Capacity Storage for Mobile and Embedded Systems," pp. 1-7, 2007 Micron Technology, Inc.

(Continued)

*Primary Examiner* — Philip Guyton
(74) *Attorney, Agent, or Firm* — Van Court & Aldridge LLP

(57) ABSTRACT

Systems and methods are disclosed for monitoring the time it takes to perform a write operation, and based on the time it takes, a determination is made whether to retire a block that is a recipient of the write operation. The time duration of the write operation for a page or a combination of pages may indicate whether any block or blocks containing the page or combination of pages is experiencing a physical failure. That is, if the time duration of the write operation for a particular page exceeds time threshold, this may indicate that this page requires a larger number of program cycles than other pages. The longer programming cycle can be an indication of cell leakage or a failing block.

10 Claims, 9 Drawing Sheets

(56) References Cited

OTHER PUBLICATIONS

Chan Huan Gim;, "A novel bitmap analysis technique—test sensitivity intensity bitmap," Physical and Failure Analysis of Integrated Circuits, 2002. I PFA 2002. Proceedings of the 9th IPFA, pp. 105-109, 2002.

Mohammad, M.G.; Saluja, K.K.;, "Electrical model for program disturb faults in non-volatile memories," VLSI Design, 2003. Proceedings of the 16th International Conference on VLSI Design, pp. 217-222, Jan. 4-8, 2003.

* cited by examiner

METHODS AND SYSTEMS FOR MONITORING WRITE OPERATIONS OF NON-VOLATILE MEMORY

FIELD OF THE INVENTION

This can relate to monitoring the time duration of write operations of non-volatile memory, such as a NAND flash memory.

BACKGROUND OF THE DISCLOSURE

Non-volatile memory (NVM) such as Nand Flash NVM have a limited lifespan. That is, the NVM can only endure a limited amount of write and erase cycles before the physical structure starts to break down and is unable to store data. Techniques such as wear leveling can be used to distribute the write and erase cycles among the NVM so that it wears out evenly. This technique can leverage erase counts or other data to determine how best to evenly wear out the NVM. However, there may be instances in which a portion (e.g., a physical block) of the NVM fails prior to experiencing a predetermined number of write and erase cycles. What are needed are techniques for detecting whether a portion of the NVM is failing or at least exhibiting traits of pending failure.

SUMMARY OF THE DISCLOSURE

Systems and methods are disclosed for monitoring the time it takes to perform a write operation, and based on the time it takes, determining whether to retire a block that is a recipient of the write operation. The time duration of the write operation for a page or a combination of pages may indicate whether any block or blocks containing the page or combination of pages is experiencing a physical failure. That is, if the time duration of the write operation for a particular page exceeds a time threshold, this may indicate that this page requires a larger number of program cycles than other pages. The longer programming cycle can be an indication of cell leakage or a failing block.

The write operation can include two parts: a buffer component and a program component, and each component has respective time durations. The program component is substantially greater in time than the buffer component, and it is generally more informative as to whether a failure has occurred or is imminent. Various embodiments can compare the combination of the buffer and program components or only the program component to a time threshold when making a determination whether to retire a block.

In one embodiment, data can be written into at least one page of a block, and a time period it takes for data to be programmed into each of the at least one page can be determined. If it is determined that the time period exceeds a time threshold, the block containing the at least one page can be retired.

In another embodiment, a NVM interface in operative communication with a NVM including a plurality of dies is provided. The NVM interface can be operative to monitor a write operation for at least one page to obtain a write operation timing parameter and monitor the at least one page for an error quantity. The NVM interface can determine if the write operation timing parameter exceeds a time threshold and if the error quantity exceeds an error threshold. The NVM interface can retire a block including the at least one page if it is determined that the write operation timing parameter exceeds the time threshold and the error quantity exceeds the error threshold.

In another embodiment, a method or system is provided to selectively retire a block based on timing data. In this method or system, timing data is obtained for at least one page in at least one block. The timing data can be associated with a time duration to perform a write operation. Criteria can be applied the timing data to determine whether the at least one block should be retired, and the at least one block is retired if it is determined the at least one block should be retired.

BRIEF DESCRIPTION OF THE DRAWINGS

The above and other aspects and advantages of the invention will become more apparent upon consideration of the following detailed description, taken in conjunction with accompanying drawings, in which like reference characters refer to like parts throughout, and in which.

DETAILED DESCRIPTION OF THE DISCLOSURE

Figure 1:
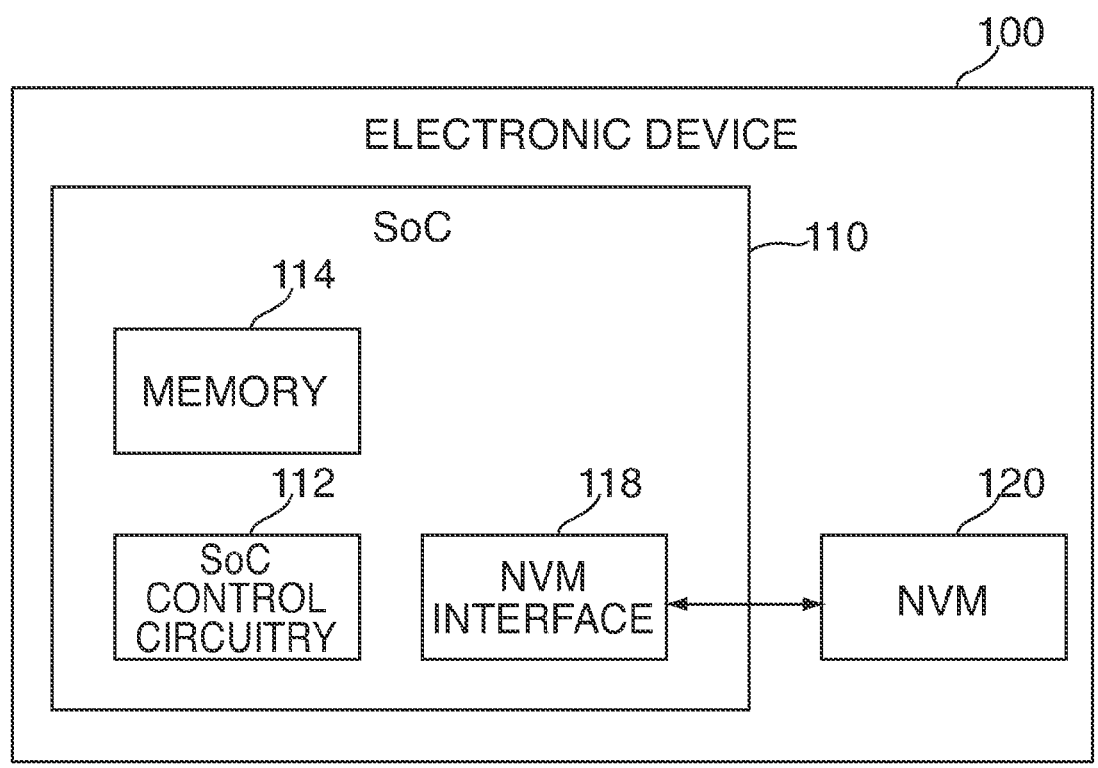
FIG. 1 is a schematic view of an electronic device configured in accordance with various embodiments of the invention.

FIG. 1 is a schematic view of electronic device 100. In some embodiments, electronic device 100 can be or can include a portable media player (e.g., an iPod™ made available by Apple Inc. of Cupertino, Calif.), a cellular telephone (e.g., an iPhone™ made available by Apple Inc.), a pocket-sized personal computer, a personal digital assistance ("PDA"), a desktop computer, a laptop computer, and any other suitable type of electronic device.

Electronic device 100 can include system-on-a-chip ("SoC") 110 and non-volatile memory ("NVM") 120. Non-volatile memory 120 can include a NAND flash memory based on floating gate or charge trapping technology, NOR flash memory, erasable programmable read only memory ("EPROM"), electrically erasable programmable read only memory ("EEPROM"), Ferroelectric RAM ("FRAM"), magnetoresistive RAM ("MRAM"), any other known or future types of non-volatile memory technology, or any combination thereof. NVM memory 120 can include one or more dies that can be organized into "blocks," which are the smallest unit of erase, and further organized into "pages," which are the smallest programmable and readable unit. Each die can include multiple blocks that can be arranged in one or more planes (or banks). Blocks from each plane or die may be virtually linked together to form "super blocks." Each memory location (e.g., page or block) of NVM dies can be addressed using a physical address (e.g., a physical page address or physical block address).

FIG. 1, as well as later figures and various disclosed embodiments, may sometimes be described in terms of using flash technology. However, this is not intended to be limiting, and any other type of non-volatile memory can be implemented instead. Electronic device 100 can include other components, such as a power supply or any user input or output components, which are not depicted in FIG. 1 to prevent overcomplicating the figure.

System-on-a-chip 110 can include SoC control circuitry 112, memory 114, and NVM interface 118. SoC control circuitry 112 can control the general operations and functions of SoC 110 and the other components of SoC 110 or device 100. For example, responsive to user inputs and/or the instructions of an application or operating system, SoC control circuitry 112 can issue read or write commands to NVM interface 118 to obtain data from or store data in NVM 120. For clarity, data that SoC control circuitry 112 may request for storage or retrieval may be referred to as "user data," even though the data may not be directly associated with a user or user application. Rather, the user data can be any suitable sequence of digital information generated or obtained by SoC control circuitry 112 (e.g., via an application or operating system).

SoC control circuitry 112 can include any combination of hardware, software, and firmware, and any components, circuitry, or logic operative to drive the functionality of electronic device 100. For example, SoC control circuitry 112 can include one or more processors that operate under the control of software/firmware stored in NVM 120 or memory 114.

Memory 114 can include any suitable type of volatile or non-volatile memory, such as dynamic random access memory ("DRAM"), synchronous dynamic random access memory ("SDRAM"), double-data-rate ("DDR") RAM, cache memory, read-only memory ("ROM"), or any combination thereof. Memory 114 can include a data source that can temporarily store user data for programming into or reading from non-volatile memory 120. In some embodiments, memory 114 may act as the main memory for any processors implemented as part of SoC control circuitry 112.

NVM interface 118 may include any suitable combination of hardware, software, and/or firmware configured to act as an interface or driver between SoC control circuitry 112 and NVM 120. For any software modules included in NVM interface 118, corresponding program code may be stored in NVM 120 or memory 114.

NVM interface 118 can perform a variety of functions that allow SoC control circuitry 112 to access NVM 120 and to manage the memory locations (e.g., pages, blocks, super blocks, integrated circuits) of NVM 120 and the data stored therein (e.g., user data). For example, NVM interface 118 can interpret the read or write commands from SoC control circuitry 112, perform wear leveling, and generate read and program instructions compatible with the bus protocol of NVM 120.

While NVM interface 118 and SoC control circuitry 112 are shown as separate modules, this is intended only to simplify the description of the embodiments of the invention. It should be understood that these modules may share hardware components, software components, or both. For example, a processor implemented as part of SoC control circuitry 112 may execute a software-based memory driver for NVM interface 118. Accordingly, portions of SoC control circuitry 112 and NVM interface 118 may sometimes be referred to collectively as "control circuitry."

FIG. 1 illustrates an electronic device where NVM 120 may not have its own controller. In other embodiments, electronic device 100 can include a target device, such as a flash or SD card, that includes NVM 120 and some or all portions of NVM interface 118 (e.g., a translation layer, discussed below). In these embodiments, SoC 110 or SoC control circuitry 112 may act as the host controller for the target device. For example, as the host controller, SoC 110 can issue read and write requests to the target device.

Figure 2A:
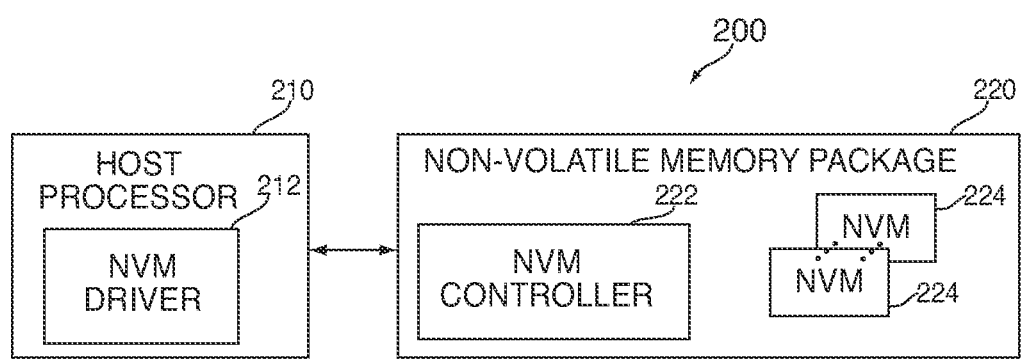
FIG. 2A is a schematic view of an illustrative system including a host processor and a managed non-volatile memory package configured in accordance with various embodiments of the invention.
Figure 2B:
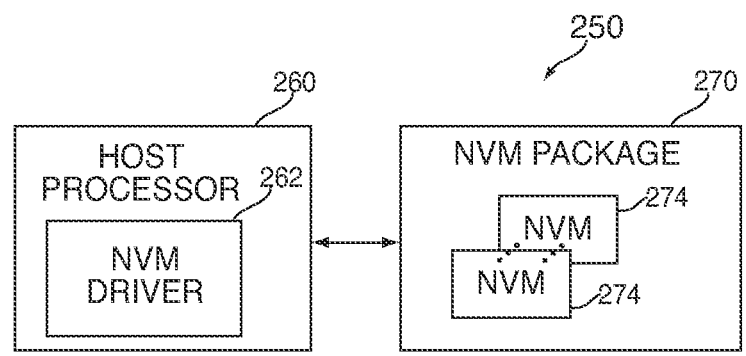
FIG. 2B is a schematic view of an illustrative system including a host processor and a raw non-volatile memory package configured in accordance with various embodiments of the invention.

FIGS. 2A and 2B are schematic views of systems, which are examples of various embodiments of embodiment 100 of FIG. 1. Looking first to FIG. 2A, system 200 can include host processor 210 and at least one non-volatile memory ("NVM") package 220. Host processor 210 and optionally NVM package 220 can be implemented in any suitable host device or system, such as a portable media player (e.g., an iPod™ made available by Apple Inc. of Cupertino, Calif.), a cellular telephone (e.g., an iPhone™ made available by Apple Inc.), a pocket-sized personal computer, a personal digital assistance ("PDA"), a desktop computer, or a laptop computer.

Host processor 210 can include one or more processors or microprocessors that are currently available or will be developed in the future. Alternatively or in addition, host processor 210 can include or operate in conjunction with any other components or circuitry capable of controlling various operations of memory system 200 (e.g., application-specific integrated circuits ("ASICs")). In a processor-based implementation, host processor 210 can execute firmware and software programs loaded into a memory (not shown) implemented on the host. The memory can include any suitable type of volatile memory (e.g., cache memory or random access memory ("RAM"), such as double data rate ("DDR") RAM or static RAM ("SRAM")). Host processor 210 can execute NVM driver 212, which may provide vendor-specific and/or technology-specific instructions that enable host processor 210 to perform various memory management and access functions for non-volatile memory package 220. Host processor 210 can perform any of the functions of SoC 110 (of FIG. 1).

NVM package 220 may be a ball grid array ("BGA") package or other suitable type of integrated circuit ("IC") package. NVM package 220 may be managed NVM package. In particular, NVM package 220 can include NVM controller 222 coupled to any suitable number of NVM dies 224. NVM controller 222 may include any suitable combination of processors, microprocessors, or hardware-based components (e.g., ASICs), and may include the same components as or different components from host processor 210. NVM controller 222 may share the responsibility of managing and/or accessing the physical memory locations of NVM dies 224 with NVM driver 212. Alternatively, NVM controller 222 may perform substantially all of the management and access functions for NVM dies 224. Thus, a "managed NVM" may refer to a memory device or package that includes a controller (e.g., NVM controller 222) configured to perform at least one memory management function for a non-volatile memory (e.g., NVM dies 224). Memory management and access functions that may be performed by NVM controller 222 and/or host processor 210 for NVM dies 224 can include issuing read, write, or erase instructions and performing wear leveling, bad block management, garbage collection, logical-to-physical address mapping, SLC or MLC programming decisions, applying error correction or detection, and data queuing to set up program operations.

NVM dies 224 may be used to store information that needs to be retained when memory system 200 is powered down. As used herein, and depending on context, a "non-volatile memory" can refer to NVM dies in which data can be stored, or may refer to a NVM package that includes the NVM dies.

Referring now to FIG. 2B, a schematic view of system 250 is shown, which may be an example of another embodiment of electronic device 100 of FIG. 1. System 250 may have any of the features and functionalities described above in connection with system 200 of FIG. 2A. In particular, any of the components depicted in FIG. 2B may have any of the features and functionalities of like-named components in FIG. 2A, and vice versa.

System 250 can include host processor 260 and non-volatile memory package 270. Unlike memory system 200 of FIG. 2A, NVM package 270 does not include an embedded NVM controller, and therefore NVM dies 274 may be managed entirely by host processor 260 (e.g., via NVM driver 262). Thus, non-volatile memory package 270 may be referred to as a "raw NVM." A "raw NVM" may refer to a memory device or package that may be managed entirely by a host controller or processor (e.g., host processor 260) implemented external to the NVM package. Host processor 260 may perform any of the other memory management and access functions discussed above in connection with host processor 210 and NVM controller 222 of FIG. 2A. In addition, host processor 260 may perform any of the functions of SoC 110 (of FIG. 1).

Figure 3:
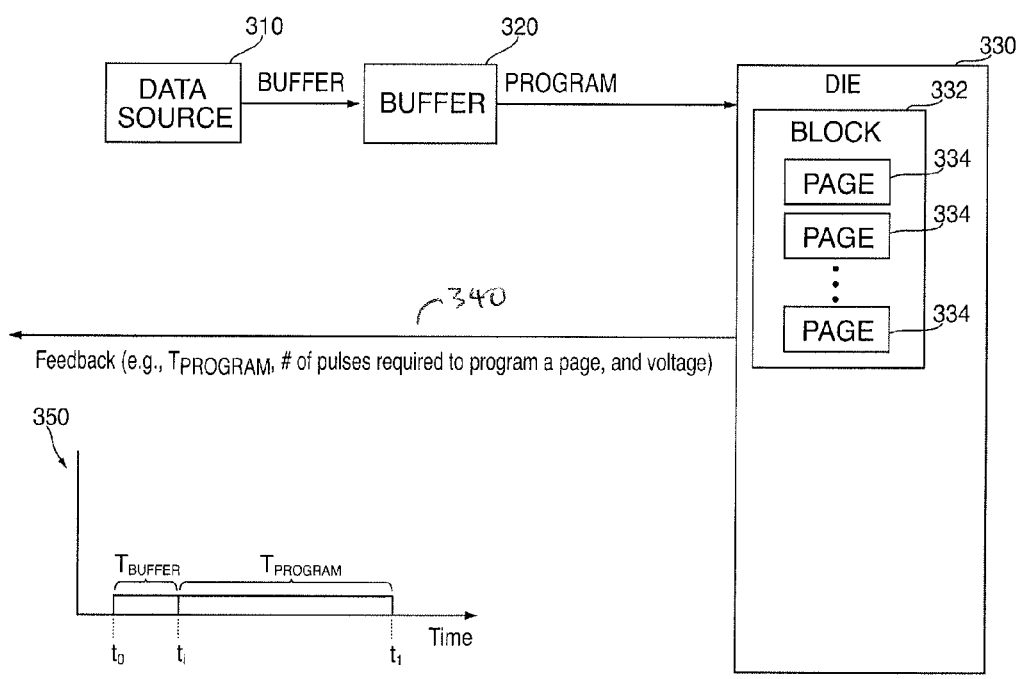
FIG. 3 is an illustrative block diagram showing in more detail a portion of a NVM package in accordance with an embodiment of the invention.

FIG. 3 is an illustrative block diagram showing in more detail a portion of a NVM package in accordance with an embodiment of the invention. FIG. 3 shows how data can be transferred from data source 310 to buffer 320, and then from buffer 320 to one of pages 334, which resides in one of blocks 332 of die 330, during a write operation. A write operation can include two parts: (1) a buffer operation, which is a transfer of data from data source 310 to buffer 320, and (2) a program operation, which is a transfer of data from buffer 320 to die 330. Both parts may have a time component associated with the time it takes to complete execution of the component. The buffer operation may have time component, Tbuffer, and the program operation may have time component, Tprogram, as illustrated in timing diagram 350. Timing diagram 350 shows a program operation starting at time, t0, and ending at time, t1. Tbuffer may occupy a relatively small portion of the overall write operation, starting at t0 and ending at ti, whereas Tprogram may occupy a relatively large portion of the write operation, starting at ti and ending at t1. In some embodiments, Tbuffer may be a relative constant for any given write operation, whereas Tprogram may vary. Thus, Tprogram can be the more informative write operation timing characteristic, and in some embodiments may be the lone timing data used in deciding whether to retire a block.

Data source 310 can be a black box representation of any source of data. For example, the data source can be data bus lines that route data to and from the NVM package. Data source 310 may receive data from a host processor such as host processor 210 or 260 of FIGS. 2A and 2B.

Buffer 320 can be any suitable structure for temporarily storing data. For example, buffer 320 may be a register. Buffer 320 may be used because it can receive and store data at a much faster rate than die 330. Thus, buffer 320 enables a NVM interface to dispatch data to respective dies for temporary and fast storage (in buffer 320), thereby freeing up the data lines for further data transfer. If buffer 320 were not present, the data lines would be busy until all the data was written to die 330.

Die 330 can include a predetermined number of physical blocks 332 and each block can include a predetermined number of pages 334. Pages and blocks represent physical locations of memory cells within die 330. Blocks are the smallest erasable unit of memory cells and pages are smallest unit of data that can be programmed or read at a time within a block. Cells within the pages or blocks can be accessed using addressing circuitry (not shown) associated with the NVM package in which the cells reside. Typically, only one block per die can be accessed at any given time. In some embodiments, a die may be divided into multiple planes, where blocks in each plane of the die can be simultaneously accessed.

In some embodiments, blocks from two or more dies can be virtually linked together to form a superblock. Blocks need not be in the same row of each die to be virtually linked as a superblock. In fact blocks may be chosen randomly from two or more dies to form a superblock. In some embodiments, blocks may be chosen from two or more planes, in which blocks in each plane are simultaneously accessible. Superblocks provide operational parallelism, thereby enabling programming, reading, and erase operations to be performed on blocks located in different planes in parallel. In another embodiment, pages from two or more dies or planes may be virtually linked together to form superpages. A translation layer being implemented in an NVM interface may keep track of superblocks or superpages.

Feedback line 340 can provide information relating to operation of die 330. For example, the feedback information such as Tprogram, the number of pulses required to program a page, a voltage signal, a voltage range, or any other information relating to operation of die 300. In addition, any information that can assist in ascertaining Tbuffer and Tprogram may be transmitted over feedback line 340. The information in feedback line 340 may be provided to an NVM controller (e.g., NVM controller 222) and/or a host processor.

Figure 4:
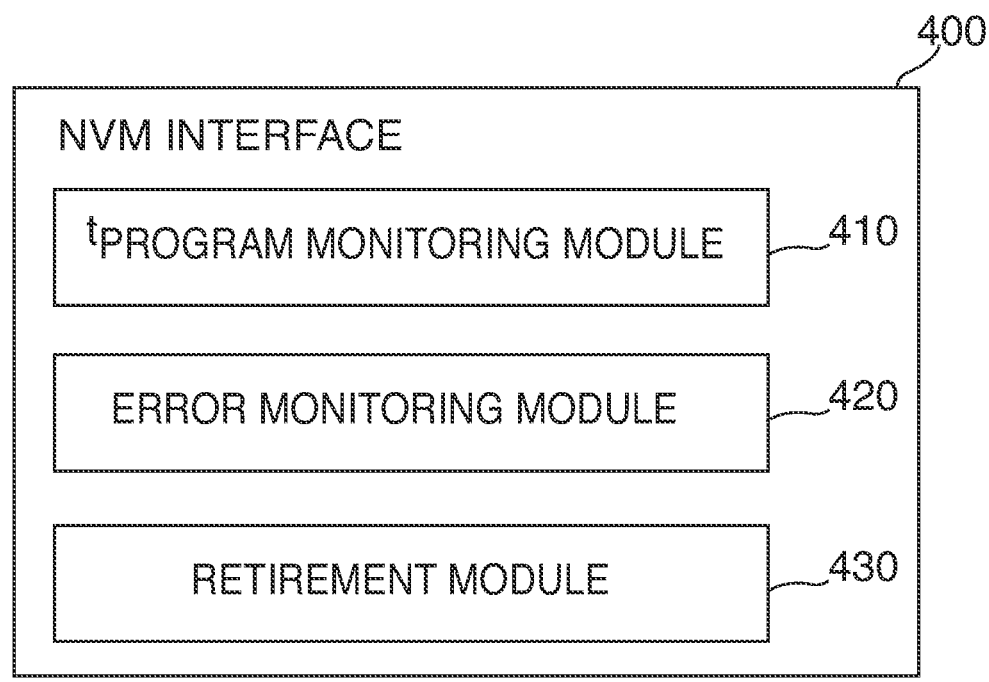
FIG. 4 shows an illustrative translation layer according to an embodiment of the invention.

FIG. 4 shows an illustrative translation layer 400 according to an embodiment of the invention. Translation layer 400 can include a tprogram monitoring module 410, an error monitoring module 420, and a retirement module 430, each of which may communicate with each other. Translation layer 400 may include other modules that may be used for performing various NVM management operations such as a wear leveling module, but are not included to avoid overcrowding the drawing. Although the modules are discussed as being part of a translation layer, it is understood that these module can be implemented in other parts of a NVM interface or a NVM controller.

Tprogram monitoring module 410 can monitor any suitable data associated with a write operation. For example, tprogram monitoring module 410 can monitor the time duration of Tbuffer and Tprogram for each write operation. The timing data can be referred to as a write operation timing parameter. Module 410 can monitor time durations of Tbuffer and Tprogram on a per page basis, a per block basis, a per superblock basis, or any combination thereof. Module 410 can obtain time averages and any other suitable metrics of Tbuffer and Tprogram on any suitable basis (e.g., per block basis). For example, module 410 can calculate the average Tprogram time for a given block by averaging the Tprogram time for each page programmed in that block. As another example, module 410 can calculate the average Tprogram time for a given superblock by averaging the Tprogram time for each programmed page in the superblock or each programmed block in the superblock. As will be discussed below in more detail, data monitored with respect to write operations may be used as a factor in determining whether to retire one or more physical blocks from further use.

Tprogram monitoring module 410 can receive data associated with a write operation and any other operation (e.g., erase or read) from the die (e.g., over feedback lines 340 of FIG. 3), a NVM controller (e.g., NVM controller 222 of FIG. 2A), a host processor, or part of a NVM interface.

Error monitoring module 420 may monitor the NVM for any data retention errors such as bit flips that may occur. The error monitoring can be done at the page, block, or superblock level. Module 420 may monitor errors such as a raw bit error rate, a modulation error rate, or a signal-to-noise ratio to determine if data is corrupted in the NVM. In one embodiment, module 420 may use an error-correcting scheme (e.g., error correction codes) or can check parity information to determine whether the NVM is experiencing data retention issues.

Block retirement module 430 is operative to selectively retire blocks in accordance with embodiments of the invention. Block retirement module 430 can retire blocks based on data provided by Tprogram monitoring module 410, error monitoring module 420, both module 410 and module 420, or any other suitable source of information. In one embodiment, module 430 may retire a block if it determines that TProgram for one or more pages in the block exceeds a TProgram threshold. The time duration of TProgram may be indicative of a problem with the physical die or at least the physical block of that die. Generally speaking, the greater the time duration of TProgram, the greater the likelihood the die (or block) is experiencing some type of failure. Determining a TProgram threshold for when to retire a block may vary based on a number of factors, which are discussed below in connection with FIG. 5. The TProgram threshold can be set for any timing parameter monitored by or calculated by monitoring module 410.

Figure 5:
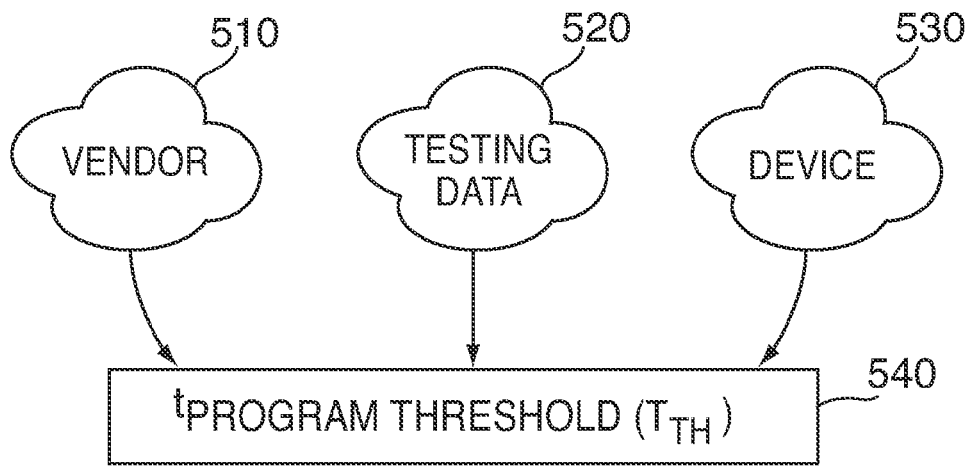
FIG. 5 is a block diagram illustrating various sources from which data can be provided to determine a time threshold for a NVM.

Turning now to FIG. 5, a block diagram is provided to illustrate various sources from which data can be provided to determine a Tprogram threshold for a NVM. As shown, Vendor source 510, testing data source 520, and device source 530 can be provided as potential sources for determining a suitable Tprogram threshold 540. Vendor source 510 refers to die vendor data. Vendor's typically supply technical specifications regarding the products they ship. These specifications can include physical data (e.g., packaging dimensions, pins, etc.) and electrical data (e.g., supply voltage), and performance data (e.g., data capacity, programming speed). The technical specifications may or may not specify a Tprogram threshold per se, but other data provided in the specification may enable one to deduce a Tprogram threshold.

Testing data source 520 refers to data obtained through testing of NVM dies, which testing may yield suitable Tprogram thresholds. NVMs are typically manufactured using substantially the same manufacturing process, have substantially the same specifications (e.g., in terms of materials used, capacity, dimensions, and the like), or are assigned the same part number by the NVM manufacturer. By testing one or more NVMs of the same type, physical memory locations that may be more susceptible to error-causing phenomena may be identified. For example, if each block of an NVM includes a sequence of pages, the test results may indicate which page(s) in the sequence tended to fail the test more often than other pages. These pages may be identified as being more susceptible to error or error-causing phenomena.

In some embodiments, a profile for a particular type of NVM may be created. The profile may combine test results from multiple NVMs of the particular type to obtain a general error pattern or trend for the NVM. This way, even if testing a specific NVM does not provide sufficient information about the error patterns of the NVM, the profile may be used to determine how to manage the NVM. In other embodiments, a specific NVM may be managed based just on testing the specific NVM, or from a combination of testing the specific NVM and the associated profile. Additional information on how testing NVM can be found, for example, in U.S. Application Publication No. 2011/0239064, published Sep. 29, 2011, the disclosure of which is incorporated by reference herein.

Device source 530 refers to the device in which the NVM resides. The device may set the Tprogram threshold independent of or based on vendor source 510 and testing data source 520. In some embodiments, the device may monitor the NVM and adjust the Tprogram threshold accordingly. For example, the NVM may perform tests on the NVM, similar to tests as that performed in testing data source 520, to ascertain a Tprogram threshold. In another embodiment, device 530 may compile information received from vendor source 510, testing data source 520, and any device derived data to determine a Tprogram threshold.

Figure 6A:
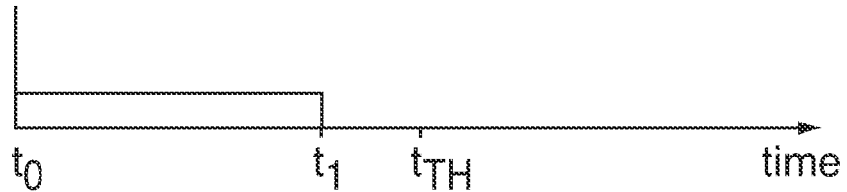
FIGS. 6A-D show several write operation timing diagrams in accordance with various embodiments of the invention.
Figure 6B:
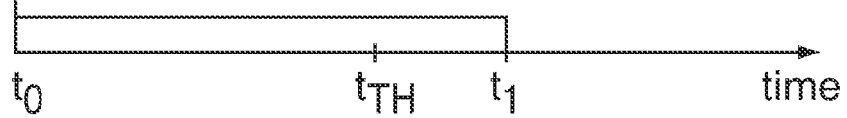

FIGS. 6A-D show several write operation timing diagrams in accordance with various embodiments of the invention. Each FIG. graphs the beginning of a write operation, which is indicated by t0 and the end of the operation, which is indicated by t1. The write operation can include both the buffer time and program time, as discussed above. Referring now to FIGS. 6A & 6B, the Tprogram threshold for programming a page is shown, as indicated by tTH. In FIG. 6A, the write operation is completed prior to tTH. Thus, the write operation for this page is completed prior to the Tprogram threshold, thereby indicating that there is no issue with programming this page. FIG. 6B, on the other hand, shows that the write operation exceeds the Tprogram threshold, thereby indicating that this page may be experiencing some type of error.

Figure 6C:
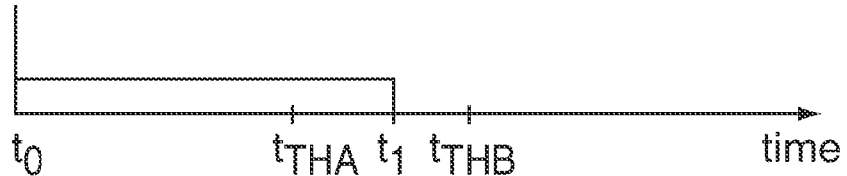
Figure 6D:
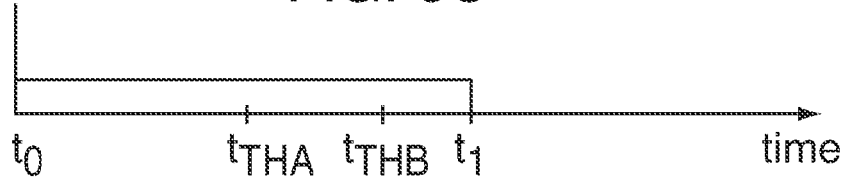

FIGS. 6C & 6D show that Tprogram threshold may exist between a range of times, as indicated by tTHA and tTHB. Tprogram threshold may have a range of threshold times to identify pages or blocks that are experiencing varying degrees of write operation times. In FIG. 6C, the write operation is shown to end within the Tprogram threshold range. Pages experiencing write operations that fall within the threshold range may be flagged or listed as suspect pages. For example, pages having such write operation time durations may be in a "grey" area where it is not readily discernable whether that page should be retired. Thus pages that fall into this area may be put into a suspect list or other data structure where additional characteristics of that page or characteristics associated with that page may be monitored or analyzed to determine whether the page or the block in which that page resides should be retired. For example, the additional characteristics can include an error rate (e.g., bit flips), the number of times the block including that page has been erased or refreshed, or any other suitable characteristic.

FIG. 6D shows that a write operation for the page exceeds the upper bound of the Tprogram threshold. In this scenario, the NVM interface may decide to retire the block including this page. The decision to retire the block may be based solely on the fact that this page exceeded the upper boundary of the Tprogram threshold, or the decision may be based on this fact and additional criteria.

Figure 7:
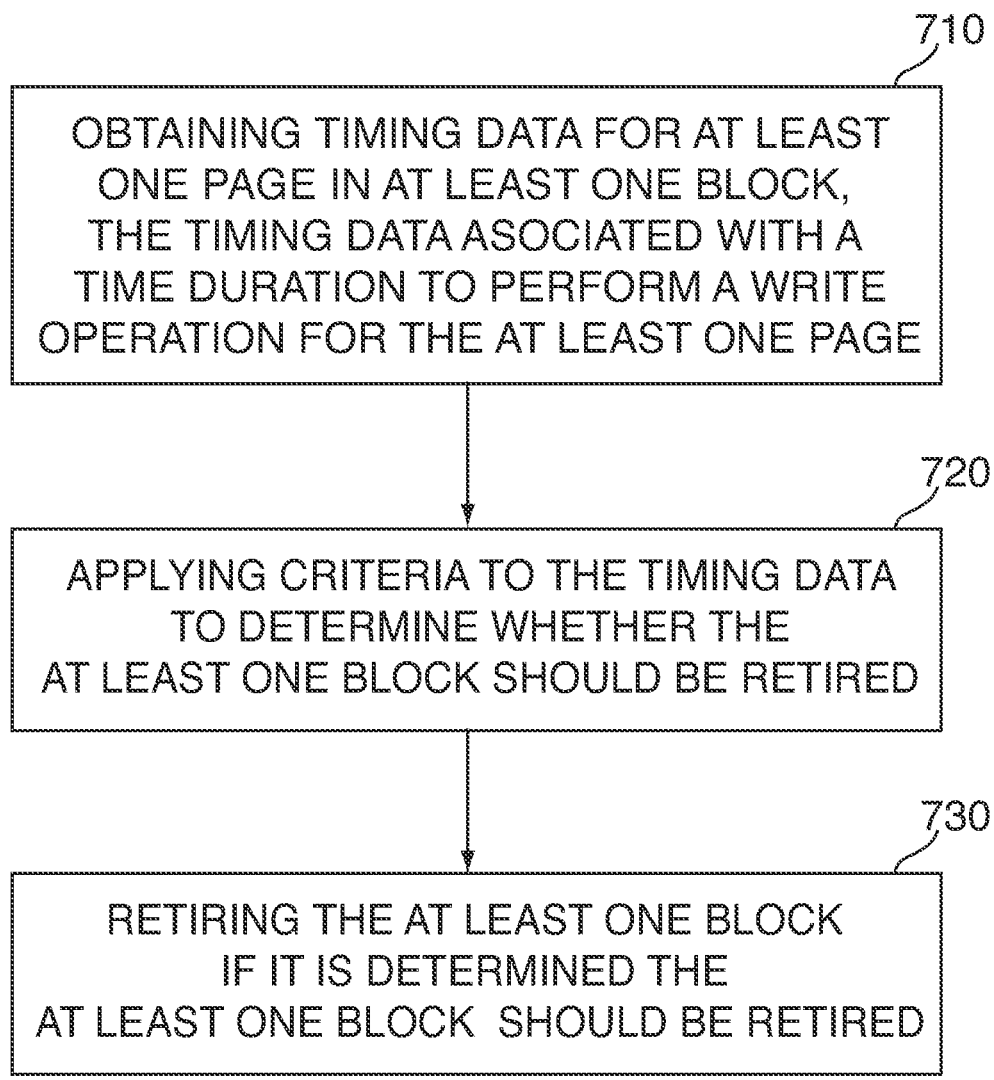
FIGS. 7-10 shows illustrative flowcharts of steps for selectively retiring a block in accordance with different embodiments of the invention.

FIG. 7 shows an illustrative flowchart of steps for selectively retiring a block in accordance with an embodiment of the invention. Beginning with step 710, timing data for at least one page of at least one block is obtained. The timing data can include the time duration to perform a write operation of each page. This can include the buffer time and program time. In some embodiments, it may only include the program time. In one embodiment, the timing data can be collected for each page in the block or a subset thereof. In another embodiment, the timing data can be collected for a portion or all pages of a superblock.

Figure 8:
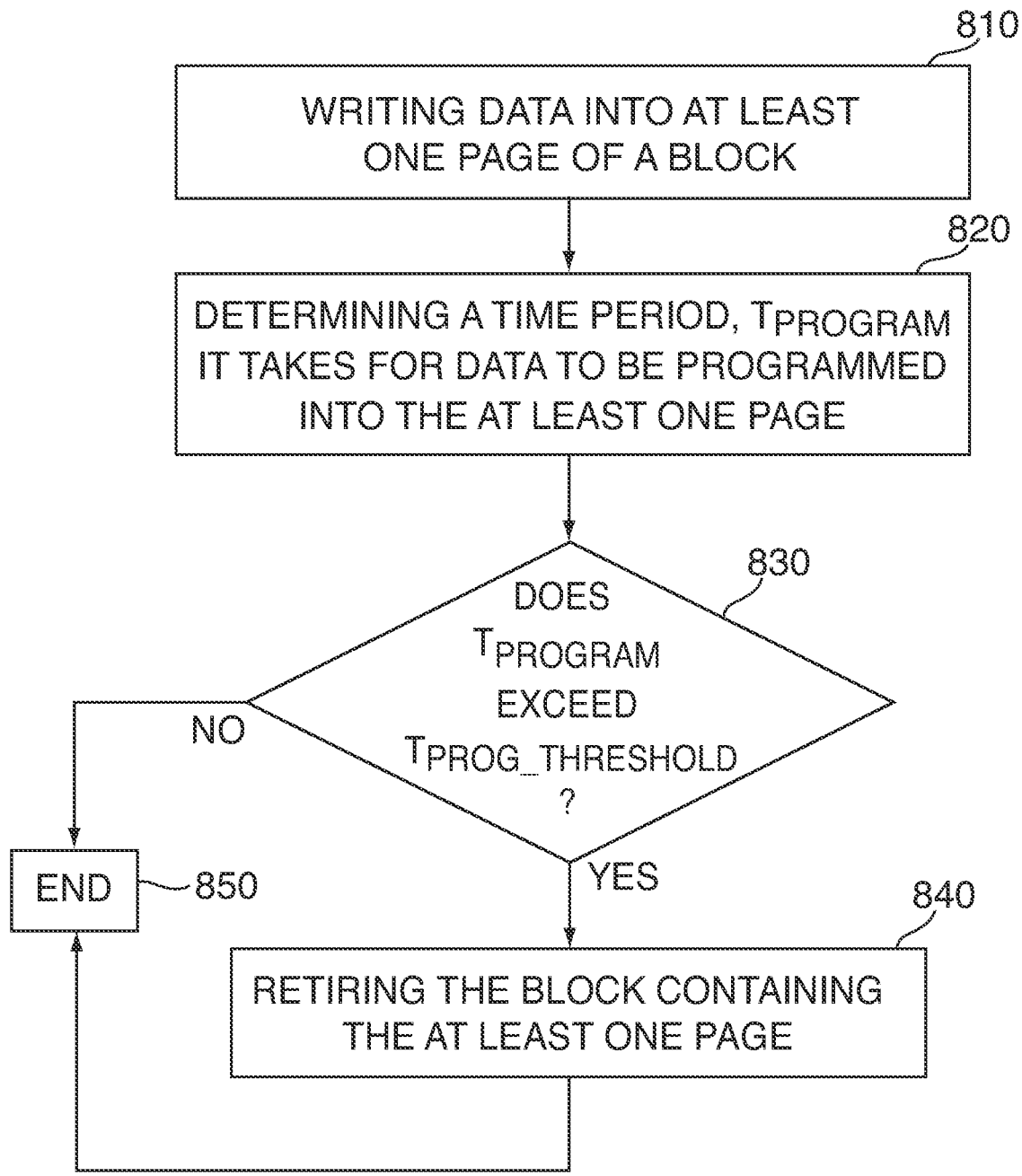
Figure 9:
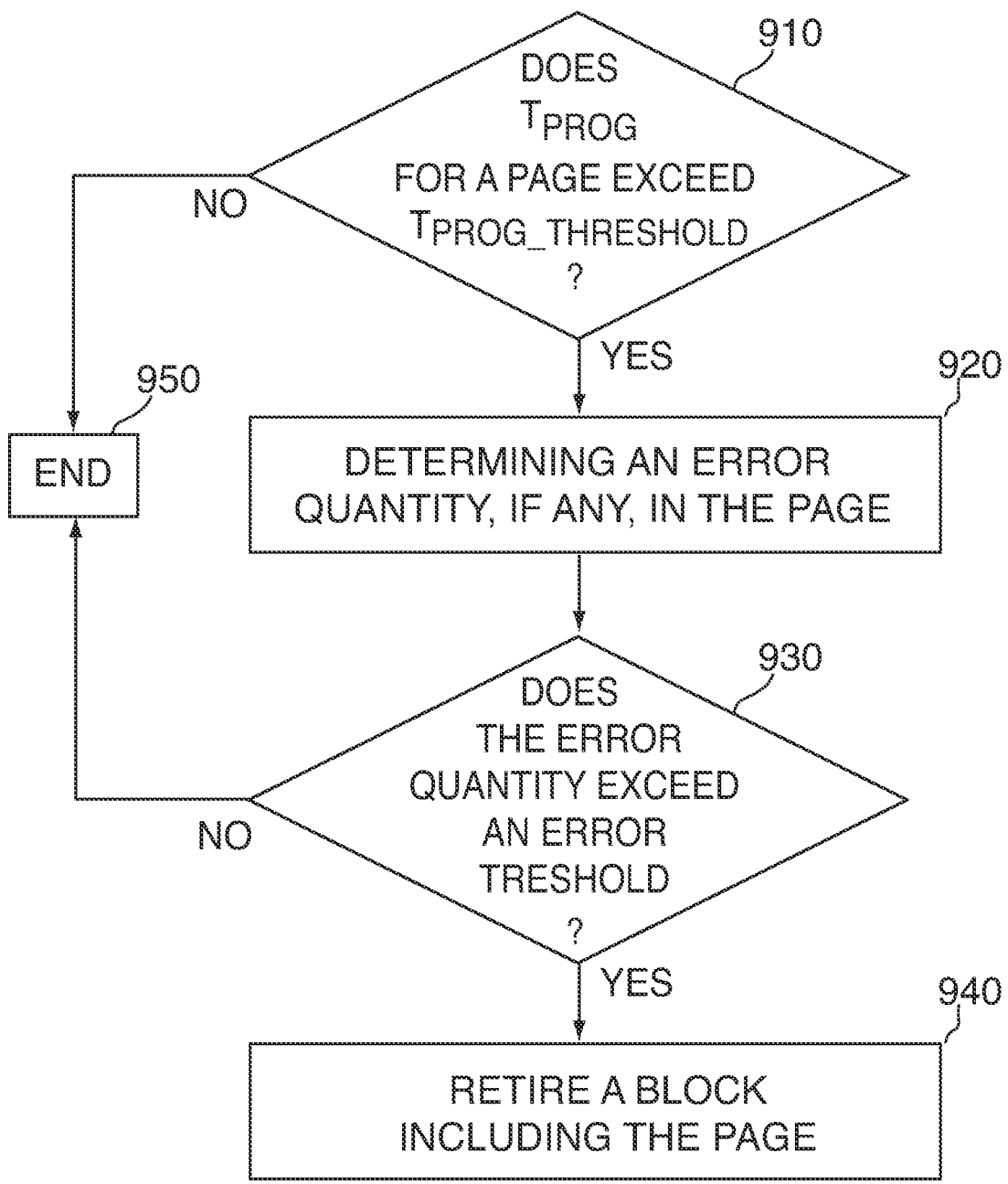
Figure 10:
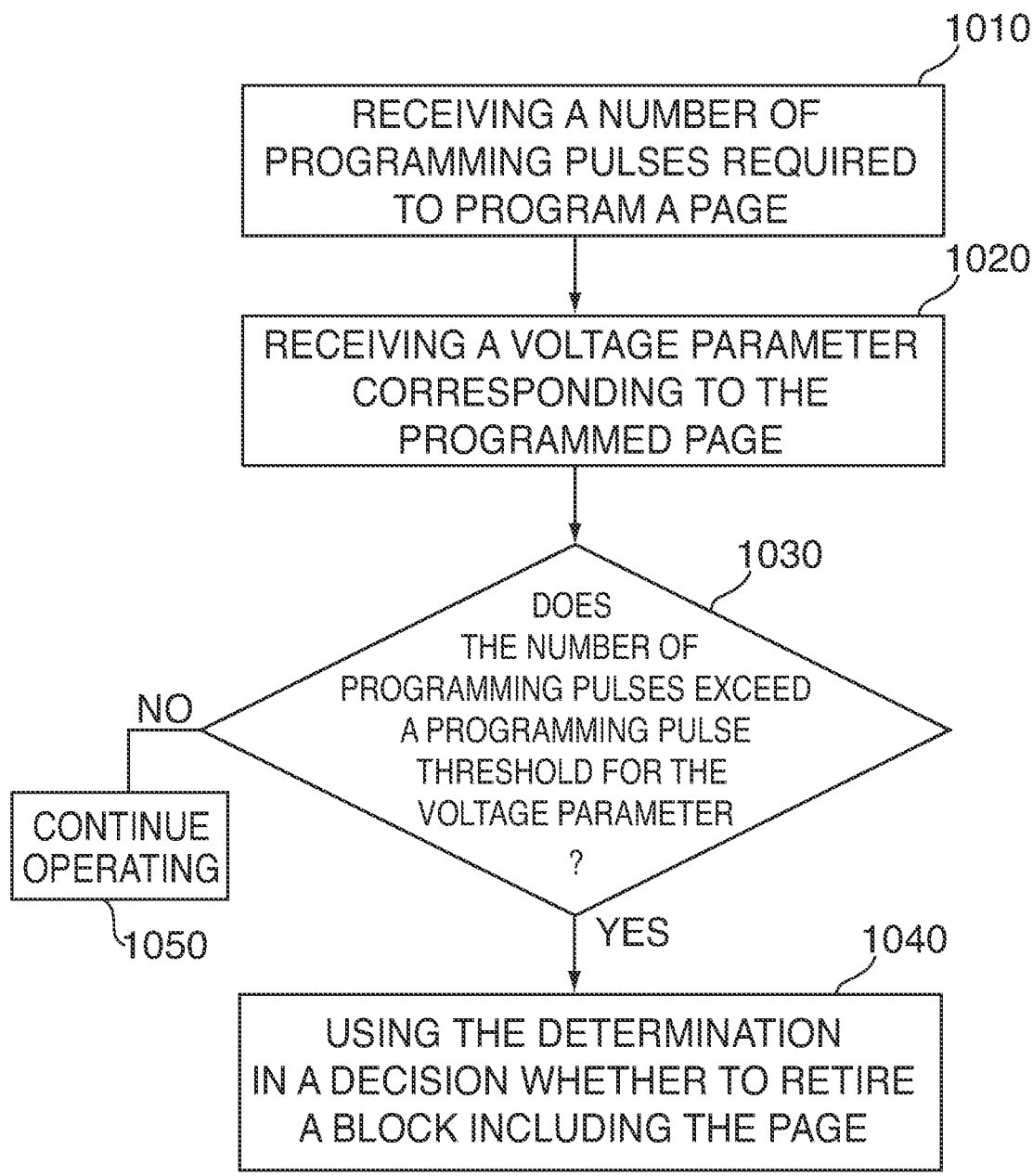

At step 720, criteria is applied to the timing data to determine whether the at least one block should be retired. Any suitable criteria can be used in making this determination. A retirement module (such as retirement module 430 of FIG. 4) may access information obtained from criteria sources such as the Tprogram monitoring and error monitoring modules (of FIG. 4) to make a decision whether to retire the at least one block. FIGS. 8-10 below further describe in more detail examples of criteria that may be applied.

At step 730, the at least one block is retired if it is determined the at least one block should be retired. Once retired, the at least one block is no longer used and may be substituted by a spare block.

FIG. 8 shows an illustrative flowchart of steps for selectively retiring a block in accordance with an embodiment of the invention. Starting at step 810, data is written into at least one page of a block. At step 820, a time period, Tprogram, is determined for the time required for data to be programmed into the at least one page. This time period and other timing information may be determined, for example, by monitoring a feedback line from the NVM (such as feedback line 340 of FIG. 3).

At step 830, a determination is made if Tprogram exceeds a Tprogram_threshold. The Tprogram_threshold may be derived from any suitable source such as those discussed above in connection with FIG. 5. If it is determined that Tprogram exceeds a Tprogram_threshold, then at step 840, the block containing the at least one page is retired. If, at step 830, the determination is NO, the process ends at step 850.

FIG. 9 shows an illustrative flowchart of steps for selectively retiring a block in accordance with an embodiment of the invention. Starting at step 910, a determination is made if a time duration, Tprogram, to program a page exceeds a Tprogram threshold. If the determination to step 910 is NO, the process ends at step 950. If the determination at step 910 is YES, the process proceeds to step 920. At step 920, an error quantity, if any, is determined for the page. The error quantity can be for any error regarding the page, including those errors discussed above in connection with error monitoring module of FIG. 4. For example, in one embodiment, the error quantity can be a number of bit flips in the page.

At step 930, a determination is made if the error quantity exceeds an error threshold. The error threshold may be static throughout the life of an NVM or it may be dynamic based on monitored characteristics of the NVM. Incorporating the error quantity in addition to the Tprogram criteria adds an additional factor for determining whether to retire a block. This additional factor can serve as a safeguard against prematurely retiring a block. That is, although the page may exceed the Tprogram threshold, it may not necessarily be ready to be retired. The additional factor can confirm whether it should be retired.

If at step 930, the determination is NO, the process can end at step 950. If at step 930, the determination is YES, the process can proceed to step 940. At step 940, a block including the page can be retired.

FIG. 10 shows an illustrative flowchart of steps for selectively retiring a block in accordance with an embodiment of the invention. Starting at step 1010, a number of programming pulses required to program a page are received. A programming pulse may be an application of voltage or current applied to a page in order to change a charge level of cells in that page. At step 1020, a voltage parameter corresponding to the programmed page is received. This voltage parameter can be the final or average voltage at which the cells in the page are programmed.

At step 1030, a determination is made if the number of programming pulses exceeds a predetermined pulse threshold for the voltage parameter. If the determination is YES, then this determination may contribute to a decision whether to retire the block including the page, as indicated by step 1040. An excessive number of programming pulses may be an indication of a physical problem with the die. If the determination is NO, then this determination may be ignored and the process can proceed as normal.

It should be understood that processes of FIGS. 7-10 are merely illustrative. Any of the steps may be removed, modified, or combined, and any additional steps may be added, without departing from the scope of the invention.

The described embodiments of the invention are presented for the purpose of illustration and not of limitation.

What is claimed is:

1. A method for selectively retiring a block in a non-volatile Nand flash memory, the method comprising:
    writing data into at least one page of a block;
    determining a time period, Tprogram, it takes for data to be programmed into each of the at least one page;
    determining if the Tprogram time period falls within a lower bound and an upper bound of a Tprogram threshold; and
    in response to determining that the Tprogram time period falls within the lower and upper bounds of the Tprogram threshold, determining whether to retire the block containing the at least one page based on at least one characteristic associated with the at least one page.

2. The method of claim 1, wherein the Tprogram threshold is set to identify a page that is potentially experiencing a physical failure.

3. The method of claim 1, the at least one page may be added to a data structure structure designed to keep track of pages exhibiting longer Tprogram time periods.

4. The method of claim 1, wherein if the Tprogram time period exceeds the upper bound, the block containing the at least one page having the Tprogram time that exceeds the upper bound is retired.

5. The method of claim 1, wherein determining the Tprogram time period comprises receiving feedback data from the nand flash memory.

6. A method for using timing data associated with a non-volatile memory, the method comprising:
    obtaining timing data for at least one page in at least one block, the timing data associated with a time duration to perform a write operation;
    applying criteria to the timing data, wherein the criteria comprises a lower time threshold and an upper time threshold; and
    determining whether to retire the at least one block if the criteria falls within the lower and upper time thresholds.

7. The method of claim 6, wherein the timing data comprises a time duration to buffer data and a time duration to program data.

8. The method of claim 7, wherein applying criteria comprises determining if the time duration to program data exceeds the upper time threshold.

9. The method of claim 6, wherein obtaining timing data comprises obtaining the timing data for each programmed page in a block.

10. The method of claim 6, wherein obtaining timing data comprises obtaining the timing data for at least one page in each block of a superblock.

* * * * *

UNITED STATES PATENT AND TRADEMARK OFFICE
CERTIFICATE OF CORRECTION

PATENT NO. : 8,751,903 B2  
APPLICATION NO. : 12/843463  
DATED : June 10, 2014  
INVENTOR(S) : Matthew Byom et al.

Page 1 of 1

It is certified that error appears in the above-identified patent and that said Letters Patent is hereby corrected as shown below:

In The Claims

In Column 10, Claim 3, Line 39, delete "claim 1, the" and insert -- claim 1, wherein the --, therefor.

In Column 10, Claim 3, Line 40, delete "structure structure" and insert -- structure --, therefor.

Signed and Sealed this  
Sixteenth Day of February, 2016

Michelle K. Lee  
*Director of the United States Patent and Trademark Office*